(12) United States Patent
Kawauchi et al.

(10) Patent No.: US 10,170,804 B2
(45) Date of Patent: Jan. 1, 2019

(54) MONITORING DEVICE FOR SECONDARY BATTERY, BATTERY PACK, AND VEHICLE

(71) Applicant: GS Yuasa International Ltd., Kyoto-shi (JP)

(72) Inventors: Tomohiro Kawauchi, Kyoto (JP); Masashi Nakamura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 228 days.

(21) Appl. No.: 15/181,214

(22) Filed: Jun. 13, 2016

(65) Prior Publication Data

US 2016/0336626 A1 Nov. 17, 2016

(30) Foreign Application Priority Data

Jun. 15, 2015 (JP) ................................ 2015-120216
Jun. 9, 2016 (JP) ................................ 2016-115771

(51) Int. Cl.
*H01M 10/48* (2006.01)
*H01M 2/34* (2006.01)
(Continued)

(52) U.S. Cl.
CPC .............. *H01M 10/48* (2013.01); *B60K 1/04* (2013.01); *B60L 3/04* (2013.01); *B60L 11/1859* (2013.01); *B60L 11/1862* (2013.01); *H01M 2/1077* (2013.01); *H01M 2/34* (2013.01); *H01M 10/0525* (2013.01); *H01M 10/425* (2013.01); *H02J 7/0029* (2013.01); *H02J 7/0031* (2013.01); *H02J 7/0032* (2013.01); *H02J 7/1461* (2013.01); *H02J 7/166* (2013.01); *B60L 2240/547* (2013.01); *H01M 2010/4271* (2013.01); *H01M 2220/20* (2013.01); *H02J 2007/0039* (2013.01); *Y02T 10/705* (2013.01);
(Continued)

(58) Field of Classification Search
CPC ........... H01M 2/34; H01M 2010/4271; H01M 10/425; H01M 10/0525; Y02T 10/7011; B60L 11/187; B60L 11/1862
See application file for complete search history.

(56) References Cited

U.S. PATENT DOCUMENTS 9,840,209 B2 * 12/2017 Krieg .................... B60L 3/0046
2012/0016547 A1 1/2012 Aridome et al.
(Continued)

FOREIGN PATENT DOCUMENTS

DE 103 46 856 A1 5/2005
DE 11 2011 102 334 T5 4/2013
(Continued)

OTHER PUBLICATIONS

Machine translation of DE 10 2011 102334.*
Extended European Search Report dated Nov. 25, 2016.

*Primary Examiner* — Renee Luebke
*Assistant Examiner* — Paul Baillargeon
(74) *Attorney, Agent, or Firm* — McGinn I. P. Law Group, PLLC (57) ABSTRACT

A monitoring device for a secondary battery includes: a detection part that detects a use state of the secondary battery; and a switching part, wherein the switching part switches a protection condition applied to the secondary battery in accordance with the user state of the secondary battery.

14 Claims, 11 Drawing Sheets

(51) Int. Cl.
*B60L 3/04* (2006.01)
*B60L 11/18* (2006.01)
*H01M 2/10* (2006.01)
*H01M 10/0525* (2010.01)
*H01M 10/42* (2006.01)
*B60K 1/04* (2006.01)
*H02J 7/00* (2006.01)
*H02J 7/14* (2006.01)
*H02J 7/16* (2006.01)

(52) U.S. Cl.
CPC ........ *Y02T 10/7011* (2013.01); *Y02T 10/7044* (2013.01)

(56) References Cited

U.S. PATENT DOCUMENTS

| | | |
|---|---|---|
| 2013/0113433 A1 | 5/2013 | Shibata et al. |
| 2013/0221741 A1 | 8/2013 | Stanek et al. |
| 2013/0221928 A1 | 8/2013 | Kelty et al. |
| 2013/0293366 A1 | 11/2013 | Suzuki et al. |
| 2014/0001844 A1 | 1/2014 | Krieg |
| 2014/0253045 A1 | 9/2014 | Poznar |
| 2014/0343831 A1 | 11/2014 | Hosey et al. |

FOREIGN PATENT DOCUMENTS

| | | |
|---|---|---|
| DE | 10 2011 087 488 A1 | 6/2013 |
| DE | 10 2013 202 725 A1 | 8/2013 |
| DE | 10 2012 211 393 A1 | 1/2014 |
| DE | 10 2013 204 527 A1 | 9/2014 |
| EP | 2 404 801 A1 | 1/2012 |
| EP | 2 439 097 A1 | 4/2012 |
| EP | 2 586 663 A1 | 5/2013 |
| JP | 2000-285968 A | 10/2000 |
| JP | 2001-286068 A | 10/2001 |
| JP | 2003-226208 A | 8/2003 |
| JP | 2004-282999 A | 10/2004 |
| JP | 2005-028951 A | 2/2005 |
| JP | WO 2010/100736 A1 | 9/2010 |
| JP | 2010-241179 A | 10/2010 |
| JP | 2011-162065 A | 8/2011 |
| JP | 2011-189804 A | 9/2011 |
| JP | 2012-029481 A | 2/2012 |
| JP | 2012-106581 A | 6/2012 |
| JP | 2013-195183 A | 9/2013 |
| JP | 2013-226909 A | 11/2013 |
| JP | 2014-030301 A | 2/2014 |
| JP | 2014-147201 A | 8/2014 |
| JP | 2015-070753 A | 4/2015 |
| JP | WO 2015/045505 A1 | 4/2015 |
| WO | WO 2015/068011 A1 | 5/2015 |

\* cited by examiner

| NUMBER | DETERMINATION CONDITION | | DETERMINATION RESULT | | PROTECTION CONDITION |
|---|---|---|---|---|---|
| | PRESENCE OR ABSENCE OF IG_ON SIGNAL | PRESENCE OR ABSENCE OF CHARGE-DISCHARGE CURRENT | USE ENVIRONMENT | USE STATE | |
| 1 | PRESENT | PRESENT | ON VEHICLE | DURING RUNNING, DURING STOP, DURING IDLING STOP | A |
| 2 | PRESENT | ABSENT | ON VEHICLE | POWER LINE ON POSITIVE ELECTRODE SIDE IS DISCONNECTED | |
| 3 | ABSENT | PRESENT | USED ALONE | EXTERNAL CHARGER OR EXTERNAL LOAD IS CONNECTED | B |
| | | | ON VEHICLE | DURING PARKING (LOAD IS PRESENT) | |
| 4 | ABSENT | ABSENT | USED ALONE | LOAD IS ABSENT | |
| | | | ON VEHICLE | DURING PARKING (LOAD IS ABSENT), POWER LINE ON NEGATIVE ELECTRODE SIDE IS DISCONNECTED | |

| NUMBER | DETERMINATION CONDITION ||| DETERMINATION RESULT || PROTECTION CONDITION |
|---|---|---|---|---|---|---|
| | PRESENCE OR ABSENCE OF IG_ON SIGNAL | PRESENCE OR ABSENCE OF CHARGE-DISCHARGE CURRENT | CONNECTION STATE OF COMMUNICATION LINE | USE ENVIRONMENT | USE STATE | |
| 1 | PRESENT | PRESENT | (CONNECTED) | ON VEHICLE | FIRST USE STATE (DURING RUNNING, DURING RUNNING PREPARATION) | A |
| 2 | PRESENT | ABSENT | CONNECTED | ON VEHICLE | SECOND USE STATE (POWER LINE ON POSITIVE ELECTRODE SIDE IS DISCONNECTED) | C |
| 3 | ABSENT | PRESENT | CONNECTED | ON VEHICLE | SECOND USE STATE (DURING PARKING, AND LOAD IS PRESENT) | B |
| | | | UNCONNECTED | USED ALONE | THIRD USE STATE (EXTERNAL CHARGER OR EXTERNAL LOAD IS CONNECTED) | C |
| 4 | ABSENT | ABSENT | CONNECTED | ON VEHICLE | SECOND USE STATE (DURING PARKING, AND LOAD IS ABSENT, POWER LINE ON NEGATIVE ELECTRODE SIDE IS DISCONNECTED) | C |
| | | | UNCONNECTED | USED ALONE | THIRD USE STATE (LOAD IS ABSENT) | B |

MONITORING DEVICE FOR SECONDARY BATTERY, BATTERY PACK, AND VEHICLE

CROSS-REFERENCE TO RELATED APPLICATIONS

This application claims the benefit of Japanese patent applications No. 2015-120216, filed on Jun. 15, 2015, and No. 2016-115771, filed on Jun. 9, 2016, which are incorporated by reference.

FIELD

The present invention relates to a technique regarding a protection condition applied to a secondary battery.

BACKGROUND

For example, a 12 V battery mounted on an automobile is used for electric power supply to an engine starting device and various vehicle loads, and is charged from an alternator. In order to use such a battery safely and efficiently, there is a battery in which a battery monitoring device and a current interruption device is mounted (JP 2013-195183 A).

In general, safety performance required by a secondary battery is different between during running and during parking, for example, and higher safety is required during running. Uniformly applying the safety performance during running may result in excessive quality or decrease in battery performance during parking.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to obtain safety performance suitable for a use state, or to obtain suppression of deterioration in battery performance.

A monitoring device for a secondary battery disclosed by the present specification includes a detection part that detects a use state of the secondary battery, and a switching part, wherein the switching part switches a protection condition applied to the secondary battery in accordance with the use state of the secondary battery.

BRIEF DESCRIPTION OF DRAWINGS

The foregoing and other features of the present invention will become apparent from the following description and drawings of an illustrative embodiment of the invention in which.

DESCRIPTION OF EMBODIMENTS

A monitoring device for a secondary battery disclosed by the present specification includes a detection part that detects a use state of the secondary battery, and a switching part, wherein the switching part switches a protection condition applied to the secondary battery in accordance with the use state of the secondary battery. The "protection condition" includes not only a condition to apply to the secondary battery, equipment that protects the secondary battery, or the like for the purpose of safe use of the secondary battery, but also a condition to apply to the secondary battery, the equipment that protects the secondary battery, or the like for the purpose of assurance of safety of equipment that receives electric power supply from the secondary battery and operates, such as a vehicle, or suppression of deterioration in battery performance.

According to the monitoring device for the secondary battery disclosed by the present specification, since the protection condition is switched, based on the use state of the secondary battery, the safety performance suitable for the use state can be obtained, or deterioration in the battery performance can be suppressed. The secondary battery can be prevented from becoming unstable or deterioration in battery performance can be prevented from progressing due to a defect on a vehicle side (trouble of the vehicle, trouble of a control device, or trouble in hardware or in software).

For the monitoring device for the secondary battery, the following configurations are preferable.

The detection part detects whether or not the secondary battery is in a first use state where the secondary battery is used in a vehicle during running or during running preparation, and the switching part switches the protection condition of the secondary battery in accordance with the detected use state. Since required safety performance or a method for suppressing deterioration in battery performance differs between in the use state where the secondary battery is used in the vehicle during running or during running preparation, and in the other use state, the two use states are detected, by which the protection condition of the secondary battery can be preferably switched.

The detection part detects whether or not the secondary battery is in a second use state where the secondary battery is used in the vehicle in a state other than the first use state, and the switching part switches the protection condition of the secondary battery in accordance with the detected use state. Moreover, the detection part detects whether or not the secondary battery is in a third use state other than the first use state and the second use state, and the switching part switches the protection condition of the secondary battery in accordance with the detected use state.

In this configuration, since the protection condition is switched in accordance with not only the first use state but the second use state and the third use state, the safety performance suitable for each of the use states or the suppression of deterioration in battery performance can be obtained.

As the protection condition, the switching part switches a use range of a voltage or an SOC of the secondary battery. In this configuration, as compared with a case where the use range is uniformly applied regardless of the use state of the secondary battery, the secondary battery can be used efficiently and safely, or the suppression of deterioration in battery performance can be realized while making the most use of the battery performance by switching the method for suppressing the deterioration in battery performance in accordance with situations. As the protection condition, the switching part switches a period from establishment of a condition for interrupting a current of the secondary battery to execution of the interruption. In this configuration, in accordance with the use state of the secondary battery, the period from the establishment of the condition for interrupting the battery to the execution can be switched.

The switching part switches an upper limit value or a lower limit value of the use range in accordance with the detected use state.

The use range includes a plurality of use ranges different in the upper limit value, and the switching part applies the use range having the lower upper limit value when the secondary battery is in the first use state where the secondary battery is used in the vehicle during running or during running preparation, and applies the use range having the higher upper limit value when the secondary battery is in the other use state. In this configuration, safety can be given priority in the use state during running or during running preparation, and use efficiency can be given priority in the other use state, or the suppression of deterioration in battery performance can be realized while making the most use of the battery performance by switching the method for suppressing the deterioration in battery performance in accordance with situations.

The use range includes a plurality of use ranges different in the lower limit value, and the switching part applies the use range having the higher lower limit value when the secondary battery is in the first use state where the secondary battery is used in the vehicle during running or during running preparation, and applies the use range having the lower lower limit value when the secondary battery is in the other use state. In this configuration, the safety can be given priority in the use state during running or during running preparation, and the use efficiency can be given priority in the other use state, or the suppression of deterioration in battery performance can be realized while making the most use of the battery performance by switching the method for suppressing the deterioration in battery performance in accordance with situations.

The detection part detects the use state of the secondary battery, based on ON/OFF of an ignition switch provided in the vehicle, and presence or absence of a charge-discharge current. The use state of the secondary battery can be detected, using basic functions of the monitoring device, which eliminates cost increase by hardware addition.

First Embodiment

A first embodiment will be described with reference to FIGS. 1 to 5.

1. Configuration of Battery Pack 20

Figure 1:
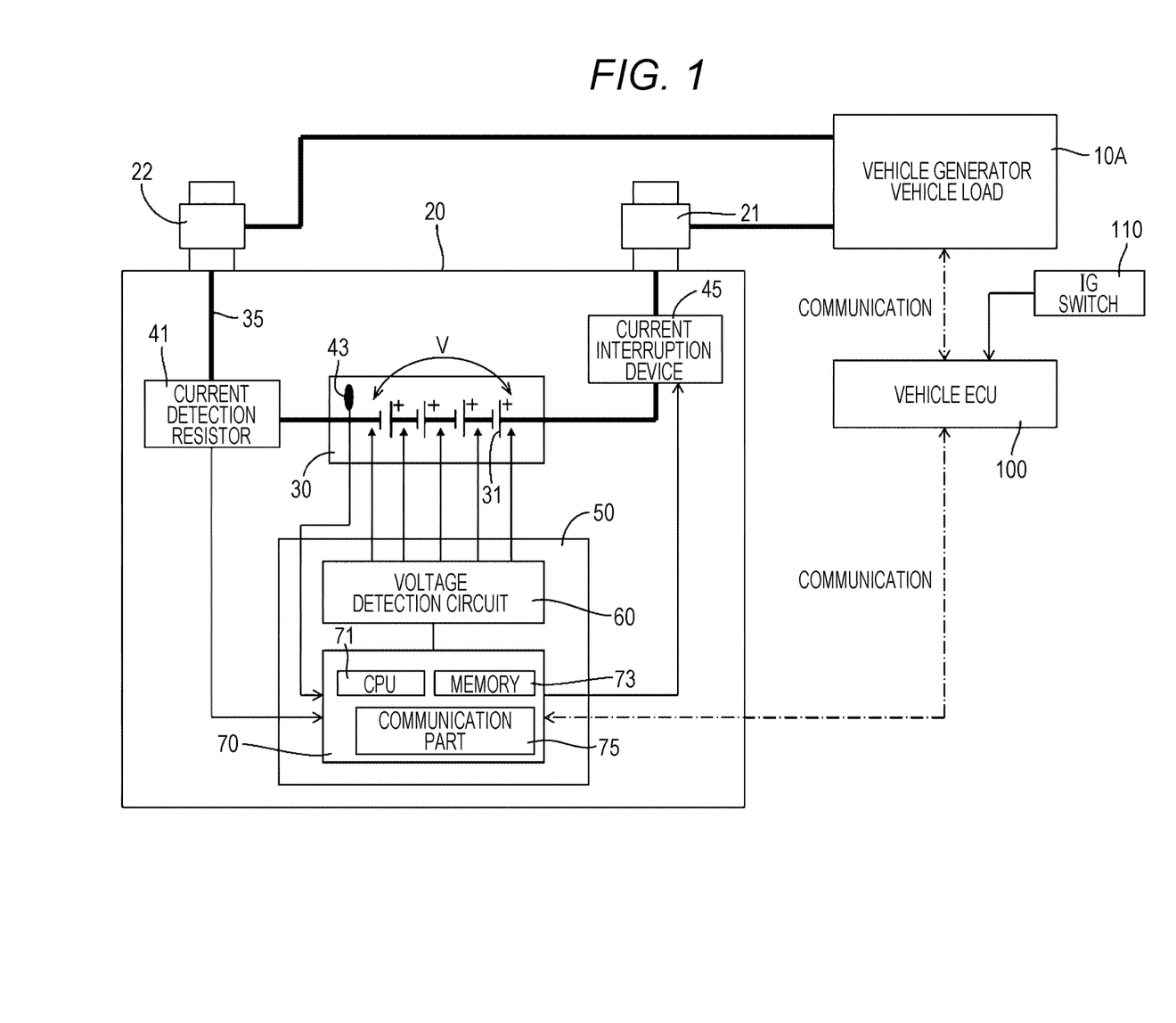
FIG. 1 shows a block diagram illustrating an electric configuration of a battery pack according to a first embodiment (when the battery pack is mounted on a vehicle).

FIG. 1 is a diagram illustrating a configuration of a battery pack 20 in the present embodiment. The battery pack 20 of the present embodiment is, for example, mounted on an electric vehicle or a hybrid electric vehicle to supply electric power to a vehicle load 10A such as an engine starting device, and to receive charge from a vehicle generator (an alternator) 10A. Reference numeral 21 shown in FIG. 1 denotes a positive electrode terminal of the battery pack 20, and reference numeral 22 denotes a negative electrode terminal.

As shown in FIG. 1, the battery pack 20 has an assembled battery 30, a current detection resistor 41, a thermistor 43, a current interruption device 45, and a battery manager (hereinafter, referred to as BM) 50 that manages the assembled battery 30. In this embodiment, the assembled battery 30 is made up of a plurality of lithium ion secondary batteries 31 connected in series. The BM 50 is an example of a monitoring device". The battery pack 20 is an example of a "battery system", and the current interruption device 45 and the BM 50 are an example of a "protection system for a secondary battery".

The assembled battery 30, the current detection resistor 41, and the current interruption device 45 are connected in series through a power line 35. In the present example, the current detection resistor 41 is disposed on a negative electrode side, and the current interruption device 45 is disposed on a positive electrode side. The current detection resistor 41 is connected to the negative electrode terminal 22, and the current interruption device 45 is connected to the positive electrode terminal 21, respectively.

The current detection resistor 41 serves a function of detecting a current flowing in the assembled battery 30. The thermistor 43 serves a function of measuring a temperature [° C.] of the assembled battery 30 in a contact method or in a noncontact method. The current detection resistor 41 and the thermistor 43 are configured to be each connected to the BM 50 by a signal line so that the BM 50 takes in a detection value of the current detection resistor 41 and a detection value of the thermistor 43.

The current interruption device 45 is, for example, a semiconductor switch such as an FET and the like, or a relay, and in response to a command from the BM 50, the current interruption device 45 opens the power line 35 on the positive electrode side to serve a function of interrupting the current of the assembled battery 30.

The BM 50 is provided inside the battery pack 20, and includes a voltage detection circuit 60 and a control part 70.

The voltage detection circuit 60 is connected to both ends of each of the secondary batteries 31 through detection lines, and serves a function of measuring a voltage of each of the secondary batteries 31, and a total voltage V of the assembled battery 30 in response to an instruction from the control part 70.

The control part 70 includes a central processing unit (CPU) 71, a memory 73, and a communication part 75. The control part 70 serves a function of determining the use state of the assembled battery 30, and a function of switching a protection condition. The control part 70 is an example of the "detection part" and the "switching part".

In the memory 73, a calculation program for executing processing for switching the protection condition, and data necessary for the execution of the program are stored. Moreover, data regarding the protection condition of the assembled battery 30 is stored.

The communication part 75 is communicably connected to a vehicle ECU (Electronic Control Unit) 100 to serve a function of communicating with the vehicle ECU 100. In the present example, a configuration is such that event information occurring in a vehicle is notified to the control part 70 from the ECU 100 side by communication. The event information includes a signal regarding an operation situation of an IG switch (ignition switch) 110 provided in the vehicle (an IG_ON signal), and a signal regarding an operation situation of a safety device of the vehicle.

The battery pack 20 configured as described above communicates with the vehicle ECU 100 mounted on the vehicle to interchange electric power with the vehicle while controlling the vehicle generator 10A.

2. Protection Condition and Protection Operation of Assembled Battery 30

As to the assembled battery 30, two protection conditions A and B are set for safety use. The "protection condition A" is a protection condition to be applied in a first use state where the battery pack 20 is used in the vehicle during running or the vehicle during running preparation. The "protection condition B" is a protection condition to be applied in a use state other than the first use state. "During running preparation" means a state where the vehicle can immediately shift to running, and includes a state where the vehicle stops in a state where an ignition key is inserted and turned to a position of ON, and a state where the vehicle stops in an idling state. In the case where the ignition is of a button engine start type, "during running preparation" means a state where the button has been pushed to ON.

Figure 2:
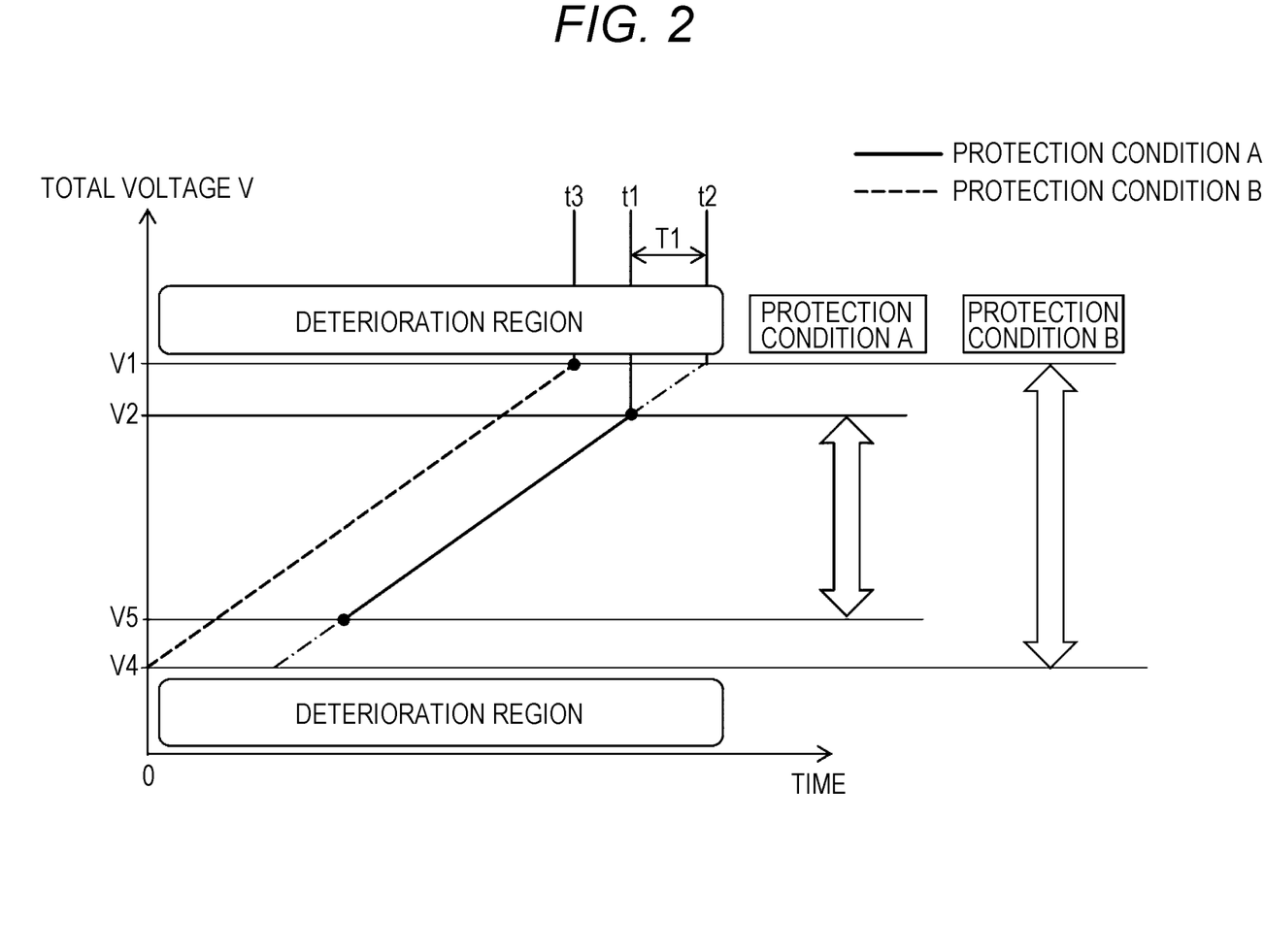
FIG. 2 shows a diagram illustrating a use range of a total voltage V (a protection condition) of an assembled battery.

In the first embodiment, as the protection condition, a use range of the total voltage V of the assembled battery 30 is prescribed. Also, a prescribed period T from establishment of a condition for interrupting the assembled battery 30 to execution of the interruption is prescribed. FIG. 2 is a diagram illustrating the use range of the total voltage V of the assembled battery 30, "V4" denotes a lower limit value of the total voltage V at which the assembled battery 30 can be safely used, or deterioration in battery performance can be suppressed, and "V1" denotes an upper limit value of the total voltage V at which the assembled battery 30 can be safely used, or deterioration in battery performance can be suppressed.

If the assembled battery 30 is left until a state lower than "V4", the assembled battery 30 is put into an unstable state, and deteriorates. Similarly, if charge is performed until a state higher than V1, the assembled battery 30 is put into an unstable state, and deteriorates.

As shown in FIG. 2, the protection condition A is that the user range of the total voltage V is "V5" to "V2". The protection condition B is that the use range of the total voltage V is "V4" to "V1". As shown in FIG. 2, as to the protection condition A, the use range of the usable total voltage V is narrower than that of the protection condition B, and both an upper limit value and a lower limit value are set differently from those of the protection condition B. Namely, the upper limit value V2 on the protection condition A is set lower than the upper limit value V1 on the protection condition B, and the lower limit value V5 on the protection condition A is set to a higher voltage than the lower limit value V4 on the protection condition B.

In a period when the "protection condition A" is applied, if the total voltage V of the assembled battery 30 reaches the upper limit value "V2" or the lower limit value "V5", the BM 50 notifies the vehicle ECU 100 that the condition for interrupting the assembled battery 30 has been established. When a prescribed period T1 passes after the total voltage V of the assembled battery 30 has reached "V2" or "V5", a command is sent to the current interruption device 45 to interrupt energization to the assembled battery 30 (protection operation A).

In an example of FIG. 2, at a time t2 when the prescribed period T1 passes after a time t1 when the total voltage V of the assembled battery 30 reaches "V2", the command is sent to the current interruption device 45 to interrupt the energization to the assembled battery 30. This can suppress overcharge or overdischarge of the assembled battery 30, which can suppress an unstable state of the assembled battery 30.

The current interruption is executed when the prescribed period T1 passes after the condition for interruption has been established. In addition, at the time point when the condition for the interruption is established, the information of the establishment is notified to the vehicle ECU 100. Thus, in response to the notification, the vehicle ECU 100 gives warning, which allows a user to move the vehicle to a safe place in the prescribed period T1. A reason why the upper limit value of the voltage is set to "V2" lower than "V1" is that the voltage is expected to be raised by charge in the prescribed period T1. That is, even if the voltage is raised by the charge in the prescribed period T1, the upper limit value of the total voltage V is beforehand kept low so as not to exceed the upper limit value "V1". The lower limit value V5 on the protection condition A is set to the higher voltage than the lower limit value V4 on the protection condition B for a similar reason.

When the total voltage V of the assembled battery 30 reaches the upper limit value "V1" or the lower limit value "V4" in a period when the "protection condition B" is applied, the BM 50 sends the command to the current interruption device 45 to immediately interrupt the energization to the assembled battery 30 (protection operation B). That is, in the protection condition A, a length of the prescribed period T is set to "T1", while in the protection condition B, the length of the prescribed period T is set to zero. In the example of FIG. 2, at a time t3 when the total voltage V of the assembled battery 30 reaches "V1", the command is sent to the current interruption device 45 to immediately interrupt the energization to the assembled battery 30. This can suppress the overcharge or the overdischarge of the assembled battery 30, and can suppress an unstable state of the assembled battery 30. As compared with the "protection condition A", the "protection condition B" has the wider use range of the total voltage V. Thus, the assembled battery 30 can be efficiently used.

3. Switching Sequence of Protection Condition by BM 50

Figure 3:
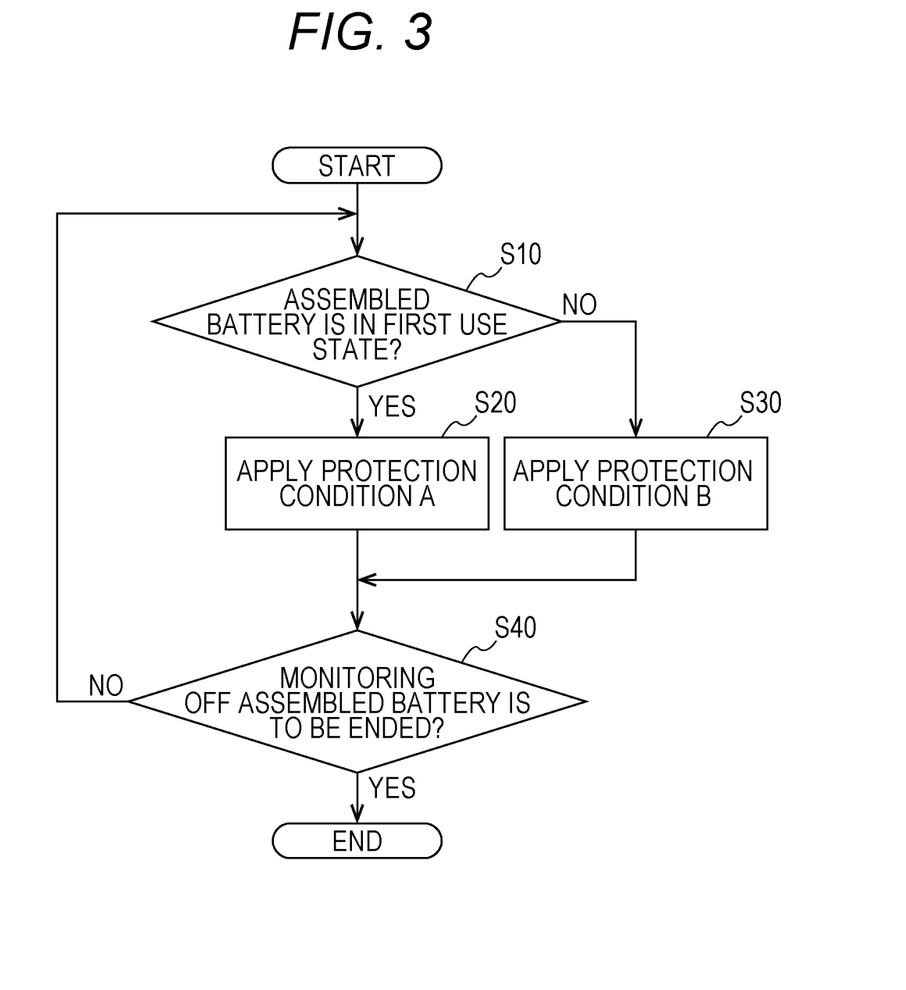
FIG. 3 shows a flowchart illustrating a switching sequence of the protection condition.

Next, a switching sequence of the protection condition will be described. The switching sequence of the protection condition shown in FIG. 3 is configured by steps S10 to S40, and is executed at the same time as the BM 50 is activated to start the monitoring of the assembled battery 30, for example.

When the processing starts, the control part 70 executes processing for determining whether or not the assembled battery 30 is in the first use state where the assembled battery 30 is used in the vehicle during running or during running preparation (S10). Specifically, while the vehicle is during running or during running preparation, the IG switch 110 is in an ON state, and a vehicle enters a state where main electric equipment and electric components have been activated, and the load is generated, so that electric power is supplied and received between the battery pack 20 and the vehicle. Accordingly, as described below, the use state of the assembled battery 30 can be determined from presence or absence of the "IG_ON signal" and presence or absence of a "charge-discharge current". Processing in S10 executed by the control part 70 realizes a function of the "detection part".

(a) Presence or Absence of IG_ON Signal

A configuration is such that when the IG switch 110 is switched from OFF to ON, the vehicle ECU 100 detects the ON operation of the IG switch 110 and sends the IG_ON signal to the BM 50. Accordingly, the control part 70 can detect the presence or absence of the IG_ON signal by the communication with the vehicle ECU 100.

(b) Presence or Absence of Charge-Discharge Current

The current flowing in the assembled battery 30 is detected by the current detection resistor 41. Thus, the presence or absence of the charge-discharge current can be detected, based on a detection value of the current detection resistor 41. In the present embodiment, the detection value of the current detection resistor 41 is compared with a threshold. If the current value is below the threshold, it is determined that the charge-discharge current is absent, while if the current value is the threshold or higher, it is determined the charge-discharge current is present.

The control part 70 detects the presence or absence with respect to the above-mentioned two conditions (a), (b), and in the case of "present" in both of the two conditions (a), (b) (in the case of number 1 shown in FIG. 4), the control part 70 determines the use state of the assembled battery 30 to be the first use state, and applies the protection condition A to the assembled battery 30 (S20).

In the case of "absent" in at least one of the two conditions (a), (b), the control part 70 determines that the use state of the assembled battery 30 is not the first use state, and applies the protection condition B to the assembled battery 30 (S30).

Figure 4:
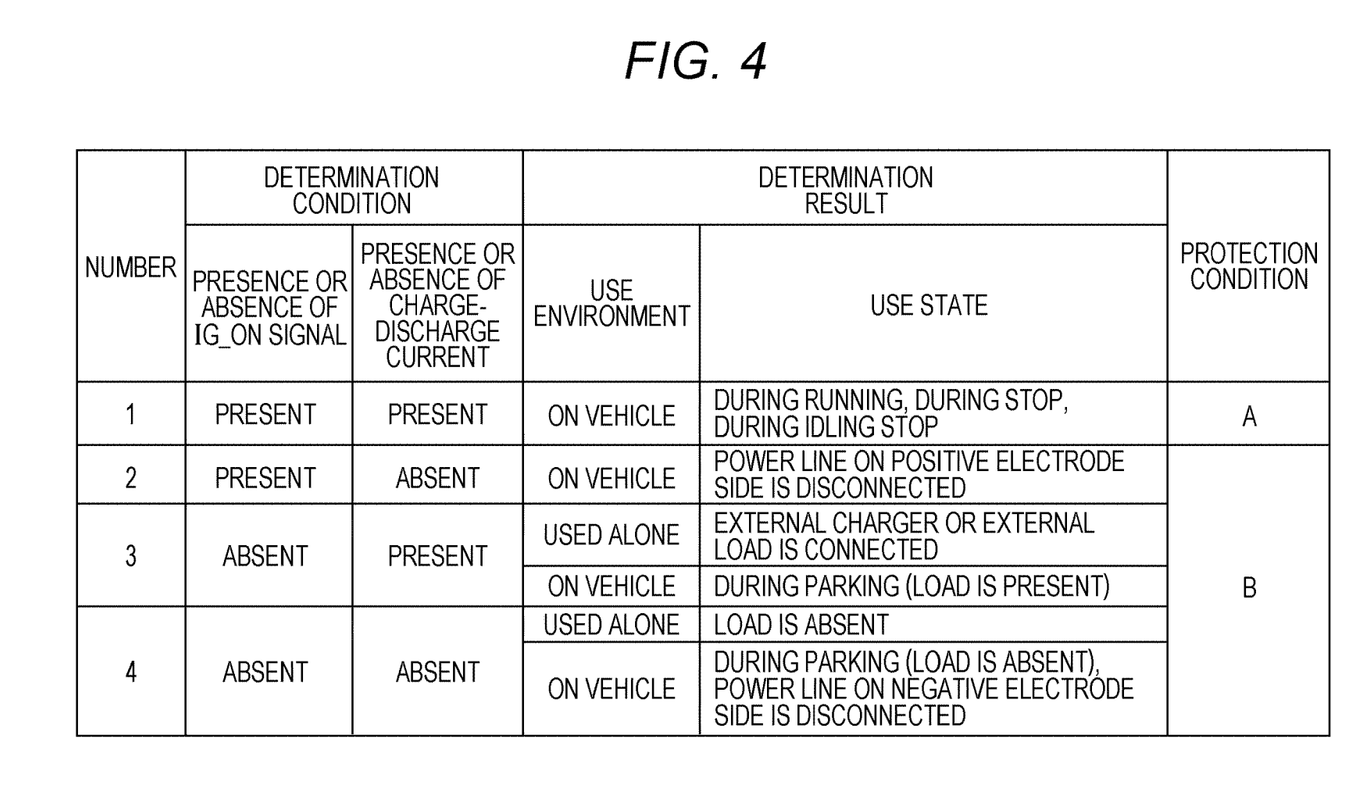
FIG. 4 shows a chart in which the use states of the assembled battery are put together.
Figure 5:
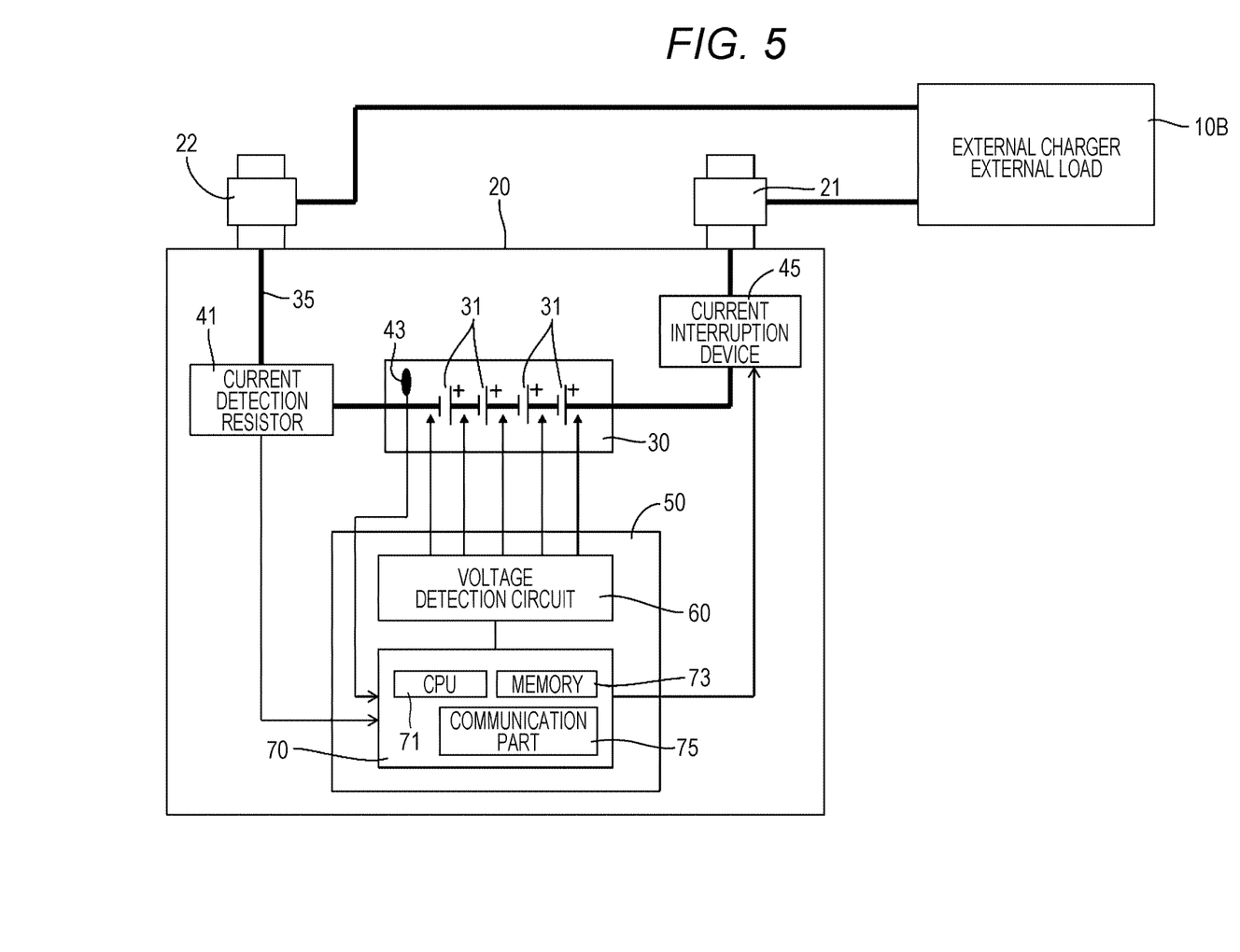
FIG. 5 shows a block diagram illustrating the electric configuration of the battery pack (when the battery pack is used alone).

If it is determined that the use state of the assembled battery 30 is not the first use state, as indicated by numbers 2 to 4 shown in FIG. 4, a case where the vehicle is in parking, or a case where the battery pack 20 is detached from the vehicle and is used alone (refer to FIG. 5), a case where the power line is disconnected, and the like are included.

When either the protection condition A or the protection condition B is applied, whether or not to end the monitoring of the assembled battery 30 is determined (S40). If the monitoring of the assembled battery 30 is continued, the processing returns to S10, in which the processing for determining whether or not the use state of the assembled battery 30 is the first use state is again performed. According to a determination result, the protection condition of the assembled battery 30 is switched.

From the foregoing, in a period when the BM 50 is monitoring the assembled battery 30, the processing in S10 to S40 is repeatedly executed, and in accordance with whether or not the use state of the assembled battery 30 is the first use state, the protection condition of the assembled battery 30 is automatically switched. That is, when the assembled battery 30 is in the first use state where the vehicle is during running, during stop, during idling stop or the like, the protection condition A is applied. On the other hand, when the use state of the assembled battery 30 is not the first use state, such as when the vehicle is in parking, when the battery pack 20 is used alone, or the like, the protection condition B is applied to the assembled battery 30. When a condition for ending the monitoring of the assembled battery 30 is established, such as a case where a state of no current lasts in a certain period, YES is determined in S40, and a series of processing ends. The processing in S20, S30 executed by the control part 70 realizes a function of the "switching part".

4. Description of Effects

As described above, the BM 50 switches the protection condition, based on the use state of the assembled battery 30. Thus, the safety performance suitable for the use state can be assured, or the suppression of deterioration in battery performance can be realized while making the most use of the battery performance by switching the method for suppressing the deterioration in battery performance in accordance with situations. That is, when the protection condition A is applied (in the case of the first use state), the use range of the total voltage V is set narrower as the protection condition. Making the use range narrower gives a margin until the total voltage V of the assembled battery 30 reaches a deterioration region after having reached the limit values of the use range V2 to V5, so that the prescribed period T1 can be provided. This enables the user to move the vehicle to the safe place in the prescribed period T1.

As for the protection condition B, since the use range of the total voltage V is set wider, as compared with the protection condition A, use efficiency of the assembled battery 30 can be increased, or the suppression of deterioration in battery performance can be realized while making the most use of the battery performance, as compared with a case where the use range of the protection condition A is uniformly applied. Even if the protection condition B is applied (in the use state other than the first use state), when the total voltage V of the assembled battery 30 reaches the upper limit value V1 or the lower limit value V4, the current is immediately interrupted, so that the assembled battery 30 can be safely used, or the suppression of deterioration in battery performance can be realized while making the most use of the battery performance by switching the method for suppressing the deterioration in battery performance in accordance with situations. For example, in a case where the detached assembled battery 20 is charged by an external charger 10B having a high charge voltage (refer to FIG. 5), the current interruption device 45 interrupts the current at the time point when the total voltage V of the assembled battery 30 reaches the upper limit value V1, and thus, the assembled battery 30 can be safely used.

Whether or not the assembled battery 30 is in the first use state is detected using the basic functions (the current monitoring function and the communication function with the vehicle ECU) of the BM 50. Thus, there is an advantage of eliminating cost increase by hardware addition.

Second Embodiment

Next, a second embodiment of the present invention will be described with reference to FIGS. 6 to 9.

A battery pack 20 of the second embodiment has an assembled battery 30, a current detection resistor 41, a current interruption device 45, and a BM 50 that manages the assembled battery 30 as with the battery pack 20 in the first embodiment. In the first embodiment, the example has been described in which in the control part 70 of the BM 50, it is detected whether or not the use state of the assembled battery 30 is the first use state, and in accordance with the detection result, the protection condition is switched. In the second embodiment, in the control part 70 of the BM 50, it is detected which of a first use state to a third use state the use state of the assembled battery 30 corresponds to, and in accordance with a detection result, protection conditions A to C are switched.

The "first use state" is a state where the battery pack 20 is used in a vehicle during running or during running preparation. The "second use state" is a use state where the battery pack 20 is used in the vehicle in a state other than the first use state. Moreover, the "third use state" is a use state other than the first use state and the second use state. As the "third use state", a state where the battery pack 20 is detached from the vehicle to be used, or a state where the battery pack 20 is used for a purpose other than the vehicle from the beginning can be exemplified.

Figure 6:
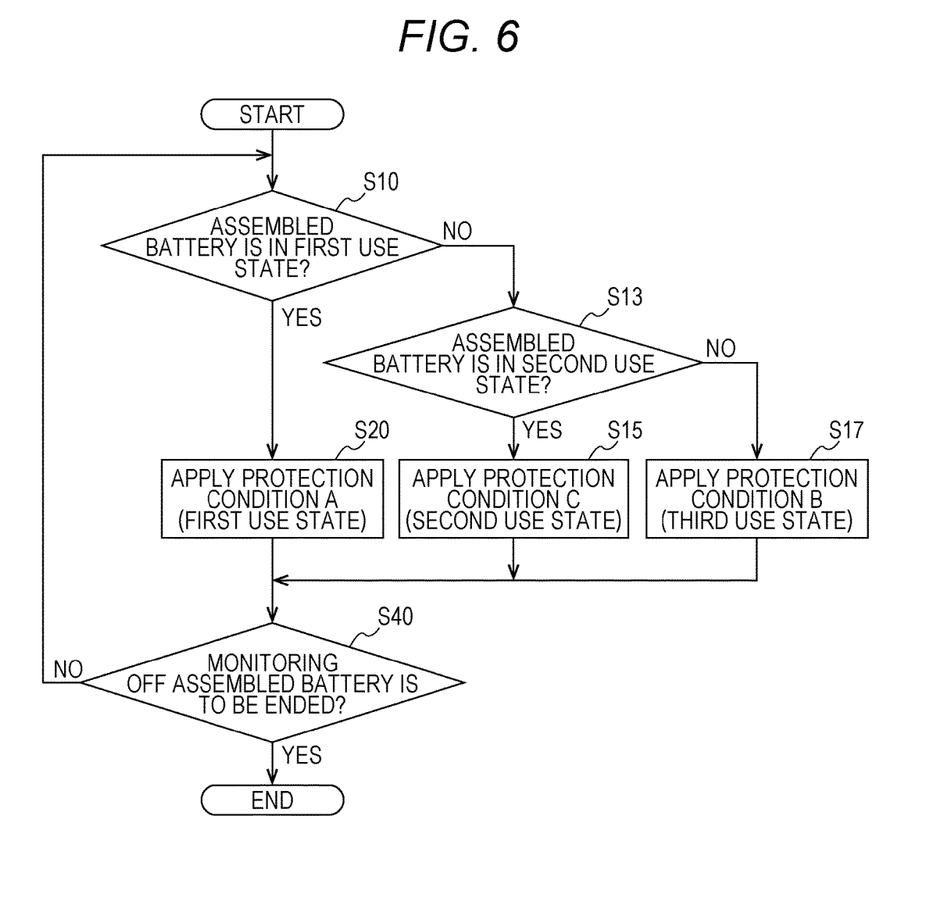
FIG. 6 shows a flowchart illustrating a switching sequence of a protection condition according to a second embodiment.

FIG. 6 is a switching sequence of the protection condition to be applied in the second embodiment, in which processing in S13 to S17 is added to the switching sequence in the first embodiment. Hereinafter, changes from the first embodiment will be mainly described.

The switching sequence shown in FIG. 6 is executed at the same time as the BM 50 is activated to start monitoring of the assembled battery 30, for example. When the processing starts, the control part 70 executes processing for determining whether or not the assembled battery 30 is in the first use state where the assembled battery 30 is used in the vehicle during running or during running preparation (S10). If it is determined that the use state is the first use state, the protection condition A is applied to the assembled battery 30 (S20, FIG. 9).

If it is determined that the use state is not the first use state, the control part 70 executes processing for determining whether or not the assembled battery 30 is in the second use state (S13). Specifically, this processing is performed by detecting whether or not a communication line L to communicably connect a vehicle ECU 100 to the BM 50 is connected. That is, if the communication line L is connected, it can be determined that the battery pack 20 is mounted on the vehicle. Thus, if it can be detected that the communication line L is connected, it can be determined that the assembled battery 30 is in the second use state.

If the communication line L is unconnected, it can be determined that the battery pack 20 is detached from the vehicle or is used for a purpose other than the vehicle from the beginning. Thus, if the communication line L is unconnected, it can be determined that the assembled battery 30 is in the third use state.

Figure 7:
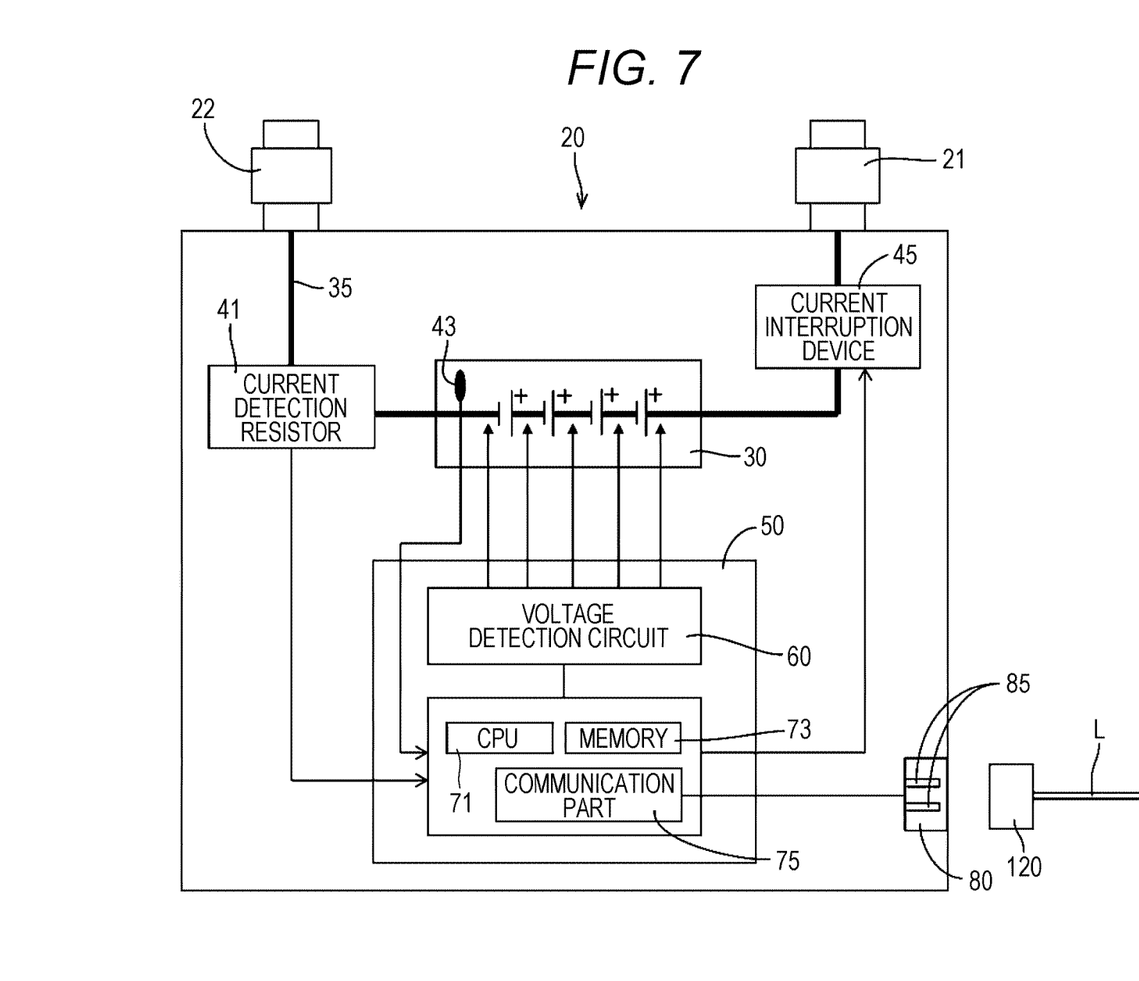
FIG. 7 shows a block diagram illustrating an electric configuration of a battery pack.

As a method for determining whether or not the communication line L is connected to the BM 50, a method of detecting a voltage value of pins 85 for communication line connection or a method of detecting presence or absence of fitting of a connector for communication line connection 120 into a connector receiving part 80 can be exemplified (refer to FIG. 7).

Figure 8:
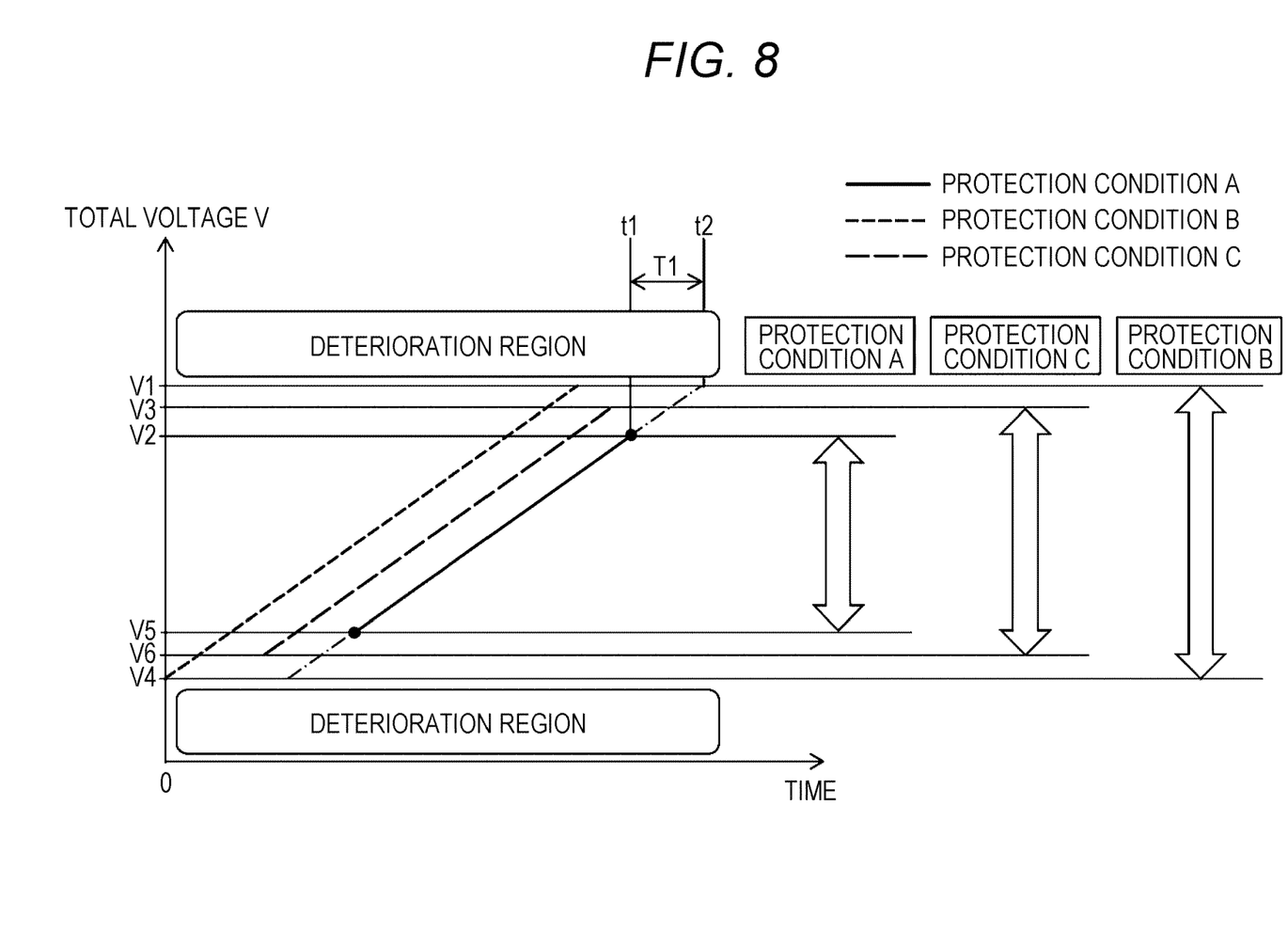
FIG. 8 shows a diagram illustrating a use range of a total voltage V (a protection condition) of an assembled battery.
Figure 9:
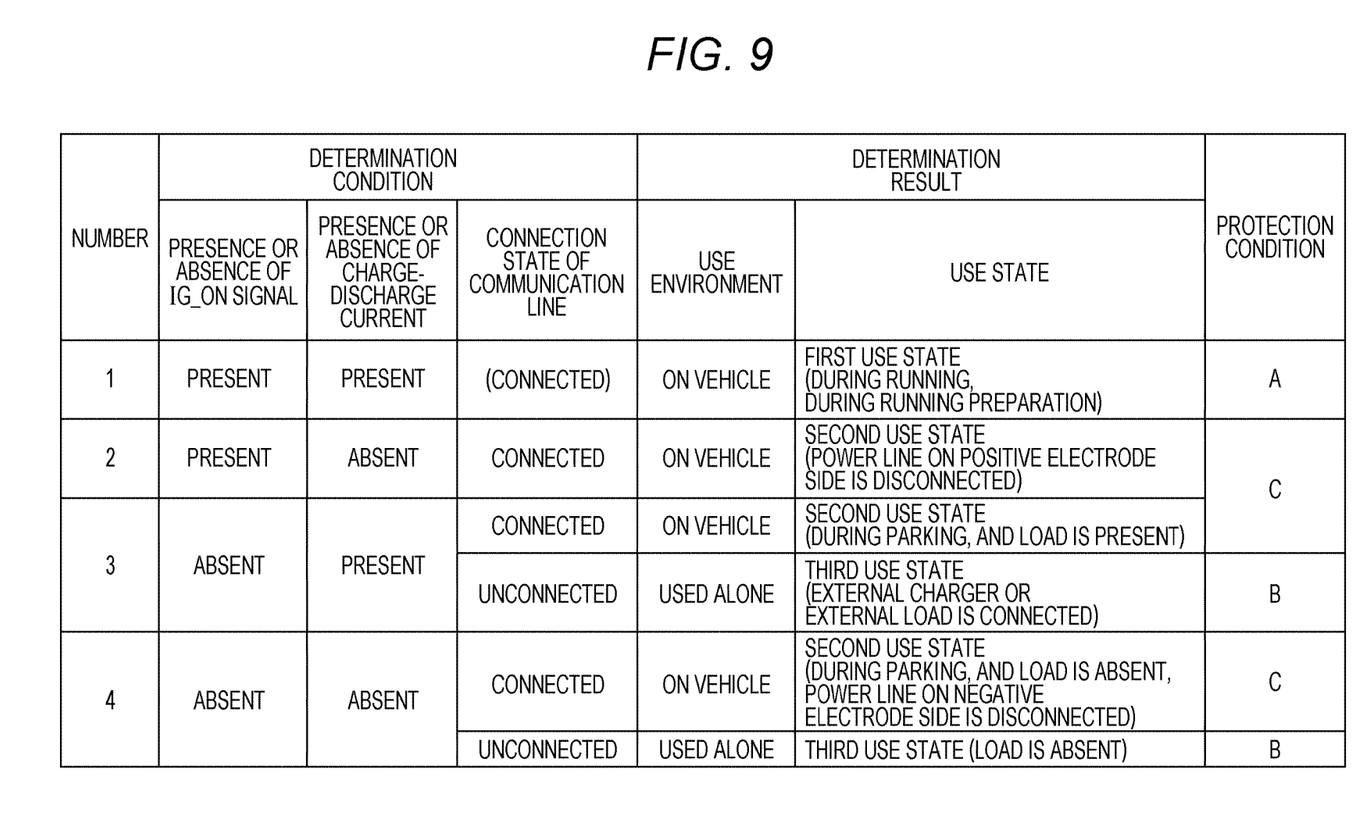
FIG. 9 shows a chart in which use states of the assembled battery are put together.

If the assembled battery 30 is in the second use state, a protection condition C is applied (S15, FIG. 9). If the assembled battery 30 is in the third use state, the protection condition B is applied (S17, FIG. 9). As shown in FIG. 8, in the protection condition C, a use range of a total voltage V is "V6" to "V3", and in the protection condition B, the use range of the total voltage V is "V4" to "V1". The use range of the protection condition C is narrower on both an upper limit side and a lower limit side than the use range of the protection condition B. A reason why the use range on the protection condition C side is set narrower is that in many cases, required safety is higher, or the suppression of deterioration in battery performance is easier when the battery is mounted on the vehicle, as compared with when the battery is detached from the vehicle. In both the protection condition B and the protection condition C, a prescribed period T is zero, and when the total voltage V of the assembled battery 30 reaches the upper limit value "V1" or "V3", or the lower limit value "V4" or "V6", a command is sent to the current interruption device 45 to immediately interrupt energization to the assembled battery 30 (protection operations B, C).

After any of the protection conditions A to C is applied, whether or not the monitoring of the assembled battery 30 is to be ended is determined (S40). If the monitoring of the assembled battery 30 is continued, the processing returns to S10, in which the processing for determining the use state of the assembled battery 30 (S10, S13, S17) is again performed. In accordance with a determination result, the protection conditions A to C of the assembled battery 30 are switched.

In the second embodiment, since the protection condition is switched in accordance with not only the first use state but also the second use state and the third use state, safety performance suitable for each of the use states can be obtained, or the suppression of deterioration in battery performance can be realized while making the most use of the battery performance by switching the method for suppressing the deterioration in battery performance in accordance with situations, and use efficiency is also increased.

As an example of the second use state, the use state in the vehicle during parking has been exemplified. However, if the vehicle is in a use state other than parking, the protection condition in accordance with the relevant use state can also be applied. For example, a state where the battery pack 20 is used in the vehicle in emergency such as when an accident occurs, and when the vehicle enters a dangerous state during running can be included in the second use state. In emergency, unlike at the normal time, if the assembled battery 30 is interrupted by the current interruption device 45, for example, a window or a door may not be opened even if the window or the door is desired to be opened. In emergency, even when the total voltage V of the assembled battery 30 reaches the upper limit value V3 or the lower limit value V6, the electric power continues to be supplied to devices regarding safety of a driver in collaboration with the vehicle ECU 100 without interrupting the assembled battery 30 (without operating the current interruption device 45), and the electric power to other devices is interrupted.

This enables the assembled battery 30 itself to be safely used while assuring the safety of the driver. Whether or not the vehicle is in emergency can be detected, for example, from an output of an acceleration sensor (not shown) mounted on the BM 50. Alternatively, an operation situation of a safety device (e.g., an automatic brake or a device for reducing an impact caused by collision) mounted on the vehicle is received by communication through the vehicle ECU 100, by which the emergency can be detected.

Third Embodiment

Next, a third embodiment of the present invention will be described with reference to FIG. 10.

In the first embodiment, as the example of switching between the protection conditions A and B, the example of switching the use range of the assembled battery 30 has been described. That is, the example has been described in which in the control part 70 of the BM 50, it is detected whether or not the use state of the assembled battery 30 is the first use state, and in accordance with the detection result, the use range of the total voltage V of the assembled battery 30 is switched. Moreover, the configuration is employed in which the prescribed period T from the establishment of the condition for interrupting the assembled battery 30 to the interruption of the assembled battery 30 is also switched. With the configuration, in the case where the protection condition A is applied (in the case of the first use state), the command is given to the current interruption device 45 to interrupt the assembled battery 30 when the prescribed period T1 passes after the condition for interrupting the assembled battery 30 has been established. Moreover, in the case where the protection condition B is applied (in the case of the use state other than the first use state), the command is given to the current interruption device 45 to immediately interrupt the assembled battery 30 in a stage where the condition for interrupting the assembled battery 30 has been established.

In a battery pack 20 of the third embodiment, only a prescribed period T is switched as a protection condition without executing switching of a use range of a total voltage V of an assembled battery 30.

Figure 10:
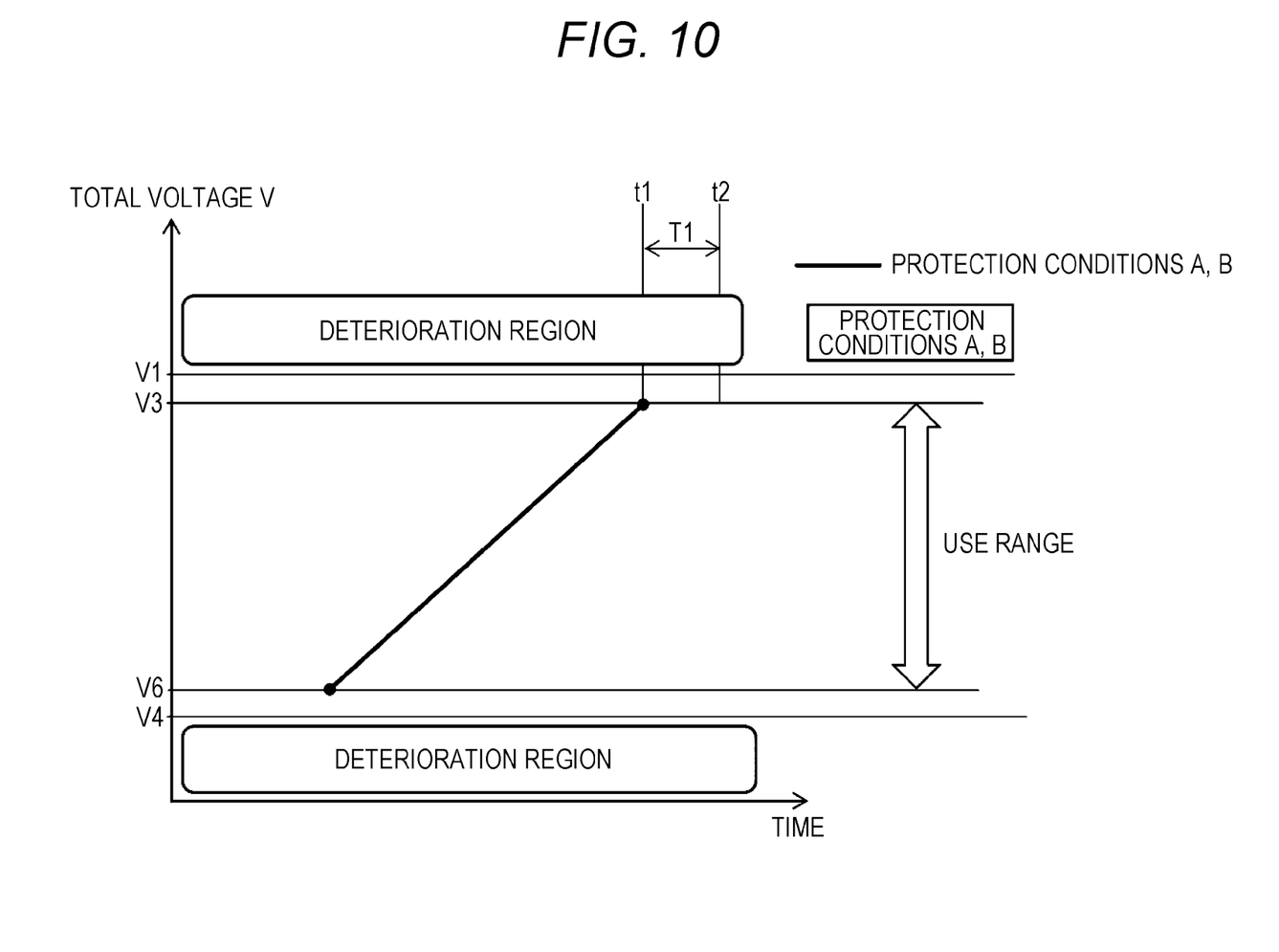
FIG. 10 shows a diagram illustrating a use range of a total voltage V of an assembled battery, and a prescribed period T in a third embodiment.

Specifically, as shown in FIG. 10, the total voltage V of the assembled battery 30 is common to protection conditions A and B, and is "V6 to V3". In the case where the protection condition A is applied (in the case of a first use state), a control part 70 gives a command to a current interruption device 45 to interrupt energization to the assembled battery 30 at a time point t2 when a "prescribed period T1" passes after a time point t1 when the total voltage V of the assembled battery 30 reaches a limit value (e.g., the upper limit "V3").

In the case where the protection condition B is applied (in the case of a use state other than the first use state), the control part 70 gives the command to the current interruption device 45 to immediately interrupt energization to the assembled battery 30 at the time point t1 when the total voltage V of the assembled battery 30 reaches the limit value (e.g., the upper limit value "V3").

An optimal value of the prescribed period T differs, depending on the use state of the assembled battery 30, and in the case of the first use state where the assembled battery 30 is used in the vehicle during running or during running preparation, a certain degree of time length is preferably assured in order to assure a time required for moving a vehicle to a safe place. In the other use state, the safety of the battery only needs to be assured, or the deterioration in battery performance only needs to be suppressed, so that the prescribed period T may be set shorter. In the third embodiment, since the prescribed period T is switched in accordance with the use state of the assembled battery 30, the safety performance suitable for the use state can be assured, or the suppression of deterioration in battery performance can be realized while making the most use of the battery performance by switching the method for suppressing the deterioration in battery performance in accordance with situations. While in the present example, the prescribed period of the protection condition B is set to "zero", obviously, the prescribed period of the protection condition B may be "T2", and the length of the prescribed period "T" may be switched between the protection conditions A and B.

Other Embodiments

The present invention is not limited to the embodiments described above with reference to the drawings, but for example, the following embodiments are also included in a technical scope of the present invention.

(1) While in the above-mentioned first embodiment, as an example of each of the secondary batteries 31, a lithium ion secondary battery is exemplified, a type of the battery is not limited to the lithium ion secondary battery, but for example, another secondary battery such as a lead-acid battery and the like may be employed.

(2) While in the above-mentioned first embodiment, as an example of the protection condition, the use range of the total voltage V of the assembled battery 30, and the prescribed period T from the establishment of the condition for interrupting the assembled battery to the execution of the interruption have been exemplified, only any one of the use range and the prescribed period T may be switched. Moreover, the protection condition is not limited to the use range of the total voltage V or the prescribed period T, but for example, a use range of an SOC of the assembled battery 30 may be employed. Alternatively, for example, any condition regarding protection such as a condition regarding limitation of a load to which the electric power is supplied may be employed. Moreover, in the case where the use range of the total voltage V is switched, not only both the upper limit value and the lower limit value are switched, but only any one of the upper limit value and the lower limit value may be switched.

(3) While in the above-mentioned embodiment 1, the example has been described in which ON/OFF of the IG switch 110 is detected, based on whether or not the IG_ON signal is received in the communication with the vehicle ECU 100, another detection method may be employed. For example, a dedicated signal line may be provided for the IG switch 110 to directly detect ON/OFF of the IG switch 110.

(4) In the above-mentioned second embodiment, the example has been described in which in the case of the third use state, the protection condition C is applied to the assembled battery 30. The third use state is the use state other than the first use state and the second use state, and the state where the battery pack 20 is detached from the vehicle to be used, or a state where the battery pack 20 is used for a purpose other than the vehicle from the beginning can be exemplified. Thus, in the case where the use purpose can be determined, the protection condition can be changed in accordance with the use purpose.

(5) When disconnection occurs in the power line of the battery pack 20 mounted on the vehicle, there is a possibility that the battery pack 20 is short-circuited via the disconnected power line. While in the first embodiment, the example has been described in which when the use state of the assembled battery 30 is not the first use state, the protection condition B is applied, in the case of numbers 2 and 4 shown in FIG. 4, the state where the power line is disconnected can be determined. Accordingly, when the disconnection of the power line is detected, the current interruption device 45 is operated to thereby assure the safety of the assembled battery 30. On which of the positive electrode side and the negative electrode side the power line is disconnected can be determined, based on whether or not the communication is established between the BM 50 and the vehicle ECU 100. If the communication is established between both, it can be determined that reference potentials (grounds) are the same on the BM 50 side and the vehicle ECU 100 side, and it is thus determined that the power line on the negative electrode side (the ground side) is normal, and that the power line of the positive electrode side is disconnected. If the communication is not established, it is assumed that the reference potentials (the grounds) are different on the BM 50 side and the vehicle ECU 100 side, and it can be thus determined that the power line on the negative electrode side (the ground side) is disconnected.

(6) In the second embodiment, whether or not the battery pack 20 is mounted on the vehicle is determined by detecting the connection state of the communication line L to the BM 50. Alternatively, for example, a contact signal of switches, a relay or the like mounted on the vehicle is detected in the BM 50 through a signal line, by which presence or absence of the mounting on the vehicle can also be detected.

(7) While the example has been described in which the BM 50 of the battery pack 20 receives power supply from the assembled battery 30 to perform driving, the present invention is not limited thereto, but a type receiving the power supply from an outside other than the assembled battery 30 to perform driving may be employed. Moreover, while the example has been described in which as to the use state of the secondary battery, the state is determined by receiving the signal from an outside such as the vehicle, the present invention is not limited thereto, but the BM 50 itself may determine the state, or the battery pack 20 may be provided with a sensor (e.g., an acceleration sensor or a GPS sensor) to determine the use state from a sensor signal thereof. Obviously, a configuration may be employed in which the use state of the secondary battery is determined from both the signal from the vehicle and the signal from the sensor included in the battery pack 20.

Figure 11:
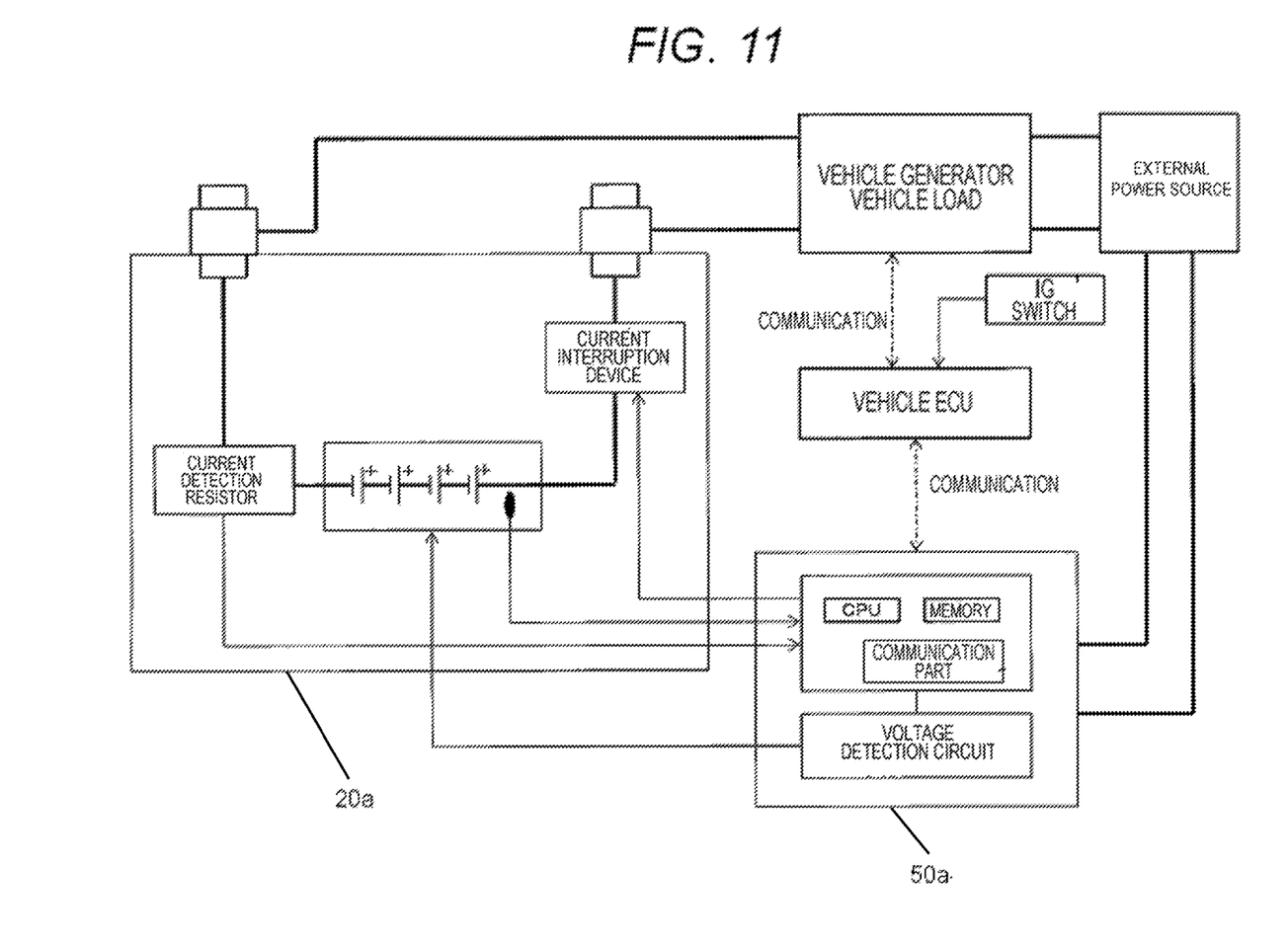
FIG. 11 shows a block diagram illustrating an electric configuration of a battery pack according to another embodiment (when the battery pack is mounted on a vehicle).

(8) While in the specification, the example has been disclosed in which the monitoring device for the secondary battery is included in the battery pack 20, the present invention is not limited thereto, but as another embodiment, it may be provided outside the battery pack 20, for example, on the vehicle side. FIG. 11 shows a BM 50*a* arranged outside a battery pack 20*a*. An external power source supplies power to the BM 50*a* to drive the BM 50*a*.

What is claimed is:

1. A monitoring device for a secondary battery, the monitoring device comprising:
    a controller configured to:
        detect whether a use state of the secondary battery is in a first use state or a second use state;
        set a first protection condition for the secondary battery, when the controller detects that the secondary battery is in the first use state;
        set a second protection condition for the secondary battery, when the controller detects that the secondary battery is in the second use state;
        notify, in a case that the first protection condition is set for the secondary battery, a vehicle electronic control unit (ECU) that a condition for interrupting is established, if a voltage or a state of chare (SOC) of the secondary battery reaches a first upper limit value or reaches a first lower limit value, and after a prescribed time, send an interruption command to a current interruption device for interrupting energization of the secondary battery; and
        send, in a case that the second protection condition is set for the secondary battery, an interruption command to the current interruption device for interrupting the energization of the secondary battery, if the voltage or the SOC of the secondary battery reaches a second upper limit value or reaches a second lower limit value,
    wherein the fit upper limit value is lower than the second upper limit value,
    wherein the first lower limit value is higher than the second lower limit value,
    wherein the first use state relates to a case where the secondary battery is used in a vehicle during a running or during a running preparation, and
    wherein the second use state relates to a case where the secondary battery is used in the vehicle other than the first use state.

2. The monitoring device for the secondary battery according to claim 1, wherein the controller is further configured to detect whether the secondary battery is in a third use state other than the first use state and the second use state, and
    wherein the protection condition of the secondary battery is set in accordance with the detected use state.

3. The monitoring device for the secondary battery according to claim 1, wherein the controller switches a period from establishment of the condition for interrupting a current of the secondary battery to execution of the interruption.

4. The monitoring device for the secondary battery according to claim 1, wherein the controller notifies an outside of the protection condition.

5. The monitoring device for the secondary battery according to claim 1, wherein the controller switches an upper limit value of the use range in accordance with the detected use state.

6. The monitoring device for the secondary battery according to claim 1, wherein the controller switches a lower limit value of the use range in accordance with the detected use state.

7. The monitoring device for the secondary battery according to claim 1, wherein the controller detects the use state of the secondary battery, based on a signal from the vehicle side, and presence or absence of a charge-discharge current.

8. A battery pack, comprising:
    a lithium ion secondary battery; and
    the monitoring device for the secondary battery according to claim 1.

9. A vehicle comprising the battery pack according to claim 8.

10. A battery pack, comprising:
    a lithium ion secondary battery;
    the monitoring device for the secondary battery according to claim 1; and
    a sensor that senses movement of the battery pack.

11. A battery pack, comprising:
    a lithium ion secondary battery;
    the monitoring device for the secondary battery according to claim 1; and
    a sensor that senses a movement of the battery pack,
    wherein the monitoring device for the secondary battery determines that the battery pack is moving, based on a sensor signal from the sensor, and sends the protection condition of the battery pack to an outside.

12. The monitoring device for the secondary battery according to claim 1, wherein, in the first protection condition, the prescribed time corresponds to a difference between a required time that the voltage of the secondary battery reaches the second upper limit value and a time that the voltage of the secondary battery reaches the first upper limit value.

13. The monitoring device for the secondary battery according to claim 1, wherein, in the first protection condition, the prescribed time is a difference between a required time that the voltage of the secondary battery reaches the second upper limit value and a time that the voltage of the secondary battery reaches the first upper limit value.

14. The monitoring device for the secondary battery according to claim 1, wherein, when the prescribed time passes after a time that the voltage of the secondary battery reaches the first upper limit value, the voltage of the secondary battery reaches the second upper limit value.

* * * * *